United States Patent [19]
Lequime et al.

[11] Patent Number: 5,335,065
[45] Date of Patent: Aug. 2, 1994

[54] SEQUENTIAL DEMULTIPLEXING RECEIVER FOR A NETWORK OF OPTICAL SENSORS USING SPECTRUM MODULATION ENCODING

[75] Inventors: Michel Lequime, Eguilles; Pierre Sansonetti, Aix en Provence, both of France

[73] Assignee: Bertin & Cie, Plaisir, France

[21] Appl. No.: 934,525

[22] PCT Filed: Feb. 13, 1992

[86] PCT No.: PCT/FR92/00141

§ 371 Date: Oct. 12, 1992

§ 102(e) Date: Oct. 12, 1992

[87] PCT Pub. No.: WO92/14990

PCT Pub. Date: Sep. 3, 1992

[30] Foreign Application Priority Data

Feb. 14, 1991 [FR] France ............................. 91 01733

[51] Int. Cl.⁵ .................................................. G01B 9/02
[52] U.S. Cl. .................................... 356/351; 356/345; 356/346; 250/227.11

[58] Field of Search ............... 356/345, 346, 351, 367; 250/227.11, 227.27, 227.29, 227.19

[56] References Cited

U.S. PATENT DOCUMENTS

| | | | |
|---|---|---|---|
| 4,867,565 | 9/1989 | Lequime | 356/351 |
| 5,179,424 | 1/1993 | Lequime et al. | 356/351 |
| 5,200,796 | 4/1993 | Lequime | 356/351 |
| 5,255,068 | 10/1993 | Emo et al. | 356/345 |

Primary Examiner—Samuel A. Turner
Assistant Examiner—LaCharles P. Keesee
Attorney, Agent, or Firm—Bell, Seltzer, Park & Gibson

[57] ABSTRACT

A sequential demultiplexing receiver for a network of sensors (20) using spectrum modulation encoding, the receiver being essentially constituted by an integrated optical circuit comprising a substrate (34) that is birefringent or semiconductive on which there are formed mode couplers or mode converters (38) operating by the electro-optical effect and that are sequentially activated at high frequency to generate optical path length differences matching those of the sensors.

16 Claims, 2 Drawing Sheets

SEQUENTIAL DEMULTIPLEXING RECEIVER FOR A NETWORK OF OPTICAL SENSORS USING SPECTRUM MODULATION ENCODING

FIELD AND BACKGROUND OF THE INVENTION

The invention relates to a sequential demultiplexing receiver for a network of interferometer optical sensors using spectrum modulation encoding, which network is illuminated by a light source of short coherence length and in which each sensor subjected to a physical magnitude to be measured generates an optical path length difference that is a function of the value of said magnitude, said optical path length differences and the differences between them being greater than the coherence length of the source.

In the prior art, the receiver associated with such a network of sensors may be an interferometer, e.g. of the Michelson type, which is tuned in succession to each of the sensors in the network so as to enable it to produce an optical path length difference that is substantially equal to the mean value of the optical path length difference of the sensor in question, thereby producing an interferometer signal at the output from the interferometer for application to a photodetector, with the phase thereof being a direct function of the difference between the path length difference in the sensor and the path length difference in the receiver, providing said difference is less than the coherence length of the source. Known techniques of phase modulation in the receiving interferometer and of demodulating the interferometer signal produced thereby make it possible to discover the phase of said signal and thus the optical path length difference in the sensor, thereby making it possible to deduce the value of the physical magnitude to be measured on the basis of prior calibration (the optical path length difference in the receiver being known).

Nevertheless, it is relatively lengthy and difficult to tune the receiving interferometer successively to each of the path length differences generated in the sensors.

Another solution in the prior art consists in providing as many receiving interferometers as there are sensors, and in connecting them to the network of sensors via optical fibers and optical couplers in a star configuration, each receiving interferometer being tuned to a corresponding sensor, thereby making parallel demultiplexing possible of the signals provided by the network of sensors. However, that requires as many receiving interferometers to be provided as there are sensors, thereby increasing the overall cost of the system.

SUMMARY OF THE INVENTION

An object of the invention is to provide a single receiver for association with a network of sensors of the above-specified type, and enabling the light signals provided by the network of sensors to be demultiplexed sequentially at a very high rate.

Another object of the invention is to provide a receiver of this type capable of being implemented in the form of an integrated optical circuit.

To this end, the present invention provides a sequential demultiplexing receiver for a network of sensors of the above-specified type, said receiver comprising means enabling path length differences tuned to those of the sensors to be generated in succession and transmitting an interferometer type signal to a photodetector, the receiver being characterized in that it is essentially constituted by an integrated optical circuit having two polarization modes or two transverse modes, the circuit comprising a substrate that is birefringent or semiconductive and on which integrated components are formed for mode coupling or mode conversion by the electro-optical effect, which components are connected in series on the substrate by a light waveguide and are individually connected to means for applying electrical voltage thereto to enable them to be activated sequentially thus generating path length differences matching those of the sensors.

In such a receiver, the required path length differences are generated in succession by the electro-optical effect mode conversion or coupling components, and the use of integrated optical techniques makes it possible to switch these path length differences very quickly.

This receiver may be of the type having two polarization modes or of the type having two transverse modes.

In the first case, the integrated optical circuit of the receiver includes an inlet polarizer and an outlet analyzer which are oriented at 45° from the neutral axes of the substrate and which are implemented using discrete components or fiber components.

Advantageously, the inlet polarizer is constituted by a polarizer oriented on a neutral axis of the substrate and followed by a TE-TM mode coupler of the type having electro-optical coupling.

Similarly, the outlet analyzer may be constituted by a TE-TM mode coupler equivalent to that described above and followed by a polarizer oriented on a neutral axis of the crystal.

This gives rise to considerable simplification in the manufacture of the polarizer and of the analyzer in the integrated optical circuit of the receiver.

The required path length differences may be generated by TE-TM mode converters which are formed in series on a light waveguide channel of the above-mentioned integrated optical circuit, and which are connected to the above-specified means for applying an electrical voltage.

In a variant, the path length differences may be generated by TE-TM mode couplers of the controlled type which are formed in series on a light waveguide channel of the integrated optical circuit of the receiver.

Such a receiver is usable with any type of network of sensors using spectrum modulation encoding together with a linking optical fiber that maintains polarization on a neutral axis on which the polarization propagates. It is also usable with a network of quasi-distributed sensors having two polarization modes, or else two guided transverse modes in a single polarization. When the network of sensors is of the type having two guided transverse modes in two polarizations, the integrated optical circuit comprises an inlet TE-TM mode separator and two parallel light waveguide channels on which the TE-TM mode couplers are formed that generate the required path length differences.

When the receiver is of the type having two transverse modes, the integrated optical circuit is of the two-mode type and includes a light waveguide channel on which corresponding mode couplers or converters are formed, together with a space filter ensuring that the two modes are mixed.

The integrated optical circuit may also include a monomode structure inlet on which a polarizer is formed.

In all cases, an electro-optical effect phase modulator may be disposed on the integrated optical circuit of the receiver.

When the substrate of the integrated optical circuit is made of semiconductor material, it is also possible to form thereon a photodetector and a phase demodulator.

In general, the invention makes it possible with a single receiver to perform sequential demultiplexing at a very high rate (which may reach values of the order of a gigahertz) on light signals provided by a network of sensors using spectrum modulation encoding.

BRIEF DESCRIPTION OF THE DRAWINGS

The invention will be better understood and other characteristics, details, and advantages thereof will appear more clearly on reading the following description given by way of example and made with reference to the accompanying drawings, in which.

DESCRIPTION OF ILLUSTRATED EMBODIMENT

Figure 1:
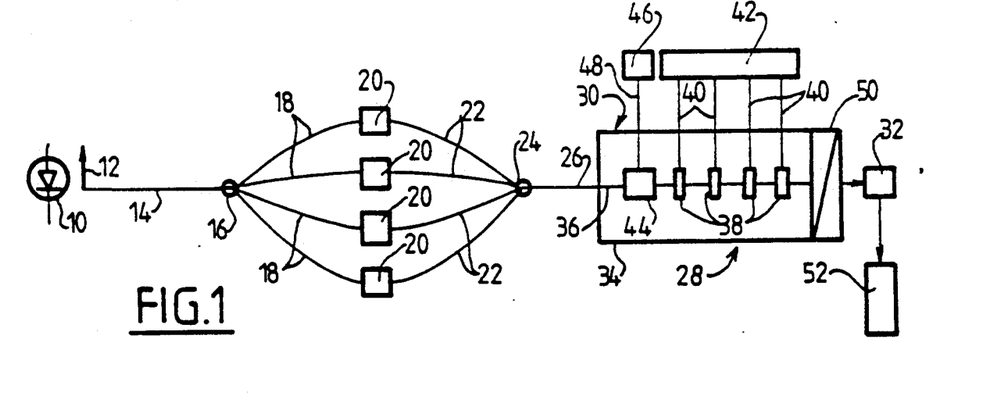
FIG. 1 is a diagram of a network of sensors using spectrum modulation encoding and associated with a receiver of the invention.

Reference is made initially to FIG. 1 which shows a star network of sensors using spectrum modulation encoding and associated with a sequential demultiplexing receiver of the invention.

The network of sensors comprises a source 10 of light having short coherence length, such as a light emitting diode (LED), the light from the source being injected via a polarizer 12 into an optical fiber 14 connected via a star coupler 16 and optical fibers 18 to interferometer sensors 20 subjected to respective physical magnitudes to be measured, e.g. such as temperature, magnitude field, displacement, etc. Each sensor 20 comprises a sensitive element such as a birefringent crystal, for example, placed between a polarizer and an analyzer which are oriented at 45° to the neutral axis of the birefringent crystal. The spectrum of the light delivered to each sensor 20 is modulated periodically at a frequency which is a function of the optical path length difference in the sensor, said optical path length difference itself being a function of the value of the physical magnitude to be measured.

The outlets from the sensors 20 are connected by optical fibers 22 to a star coupler 24 itself connected by an optical fiber 26 to a sequential demultiplexing receiver, given overall reference 28.

In the prior art, said receiver may be constituted by a two-wave interferometer which generates an optical path length difference that is tuned successively to the mean values of the various optical path length differences generated in the sensors 20.

When these optical path length differences are greater than the coherence length of the light source 10, and when the differences between said optical path length differences are also greater than said coherence length, a sinusoidal signal is obtained at the outlet from the receiving interferometer, and the phase of the signal is the phase difference between the sensor 20 in question and the receiving interferometer when the difference between the path length difference of the sensor and that of the receiver is less than the coherence length of the source. Given that the path length difference in the receiving interferometer is known, the path length difference in the sensor can be deduced, and thus the value of the physical magnitude to which the sensor is subjected can be deduced.

In the embodiment of FIG. 1, the receiver 28 of the invention is of the type having two polarization modes and it is constituted essentially by an integrated optical circuit 30 associated with a photodetector 32. The integrated optical circuit 30 has monomode optical structure and it comprises an anisotropic substrate 34 of the LiNbO$_3$ or the LiTaO$_3$ type, for example, or of a semiconductor material (e.g. of the GaAs type) in which propagation takes place in a birefringent transverse plane. The substrate includes a light waveguide 36 generally made by diffusing titanium and extending between the inlet and the outlet of the integrated optical circuit 30, interconnecting in series TE-TM mode converters 38 formed on the substrate 34. Each converter 38 enables light to be switched from one polarization mode to the other, generally by the electro-optical effect. To do this, a network of electrodes 40 is provided to apply the desired electrical voltages to the comb-electrode converters 38, and is connected to a very high frequency switching circuit 42 (which frequency may be of the order of a gigahertz).

In this type of receiver, a transverse plane of birefringent propagation of the substrate is used. TE and TM modes do not have the same propagation constant and they do not couple. However, if an electro-optical effect is applied by means of a comb of electrodes connected to a common potential and distributed periodically along the guide in such a manner that the period corresponds to a path length difference which is a multiple of the wavelength between the two modes, then coupling takes place in phase and may reach any value lying in the range 0 to 1. The value 0 corresponds to an exit mode without change and the value 1 corresponds to conversion into the other mode.

Converters of this type have already been made on x-cut and z-cut LiNbO$_3$ substrates using the high coupling coefficient $r_{51}$. Since the birefringence of LiNbO$_3$ is strong, of the order of $8 \times 10^{-2}$, the periodicity of the electrodes is of the order of 10 μm for a wavelength of 0.8 μm. Such a component also behaves as a space filter, with its resolving power $\lambda/\Delta\lambda$ being equal to the number of electrodes. When using a wide spectrum source 10, if $\Delta\lambda$ has a value of 10 nm at 0.8 μm, the number of electrodes required is 80 and the converter is 800 μm long.

The birefringence may also be reduced by using a substrate at a few degrees from the optical axis.

Another solution for obtaining a filter having a wide passband is to use a period that varies along the comb of electrodes in the component.

A final solution for reducing birefringence locally is to perform local proton exchange in the coupler while retaining the light waveguide effect achieved by diffusing titanium.

The receiver comprising these TE-TM mode converters operates on the following principle:

If d is the path length difference between the fast axis and the slow axis of a birefringent crystal over a run of length l (where $d = Bl$, B being the birefringence), then using a TE-TM converter at the inlet to said run causes an optical path length difference of $-d$ to be generated.

If L is the length of the light waveguide 36 of the substrate 34, then the optical path length difference generated without activating the converters 38 is $D_0 = BL$.

If the converter 38 closest to the outlet of the light waveguide is activated, then the path length difference generated becomes $D_1 = D_0 - d_1$, where $d_1$ corresponds to the path length difference between the converter 38 and the outlet of the light waveguide.

Similarly, if the last but one converter 38 is activated, then the generated optical path length difference will be $D_2 = D_0 - d_2$, where $d_2$ corresponds to the optical path length difference from the last but one converter 38 to the output of the light waveguide.

By an appropriate choice of dimensions and of gaps between the converters 38, it is thus possible to generate all of the required path length differences tuned to the path length differences of the sensors 20 in succession by sequentially activating the converters 38.

It is also possible to provide for a plurality of converters 38 to be activated simultaneously, providing the algebraic sum of the corresponding path length differences has a desired value.

The integrated optical circuit 30 also includes on the substrate 34 and upstream from the first converter 38, an electro-optical effect phase modulator 44 connected to a control circuit 46 by an electrode 48.

The output from the integrated optical circuit 30 includes an analyzer 50 which is oriented at 45° to the neutral axes of the light waveguide (or of the substrate). The light leaving the analyzer 50 is picked up by the photodetector 32 and its output signal is transmitted to a phase demodulation circuit 52.

The optical fibers 14, 18, 22, and 26 of the system are monomode fibers that maintain polarization. The light emitted by the source 10 is injected by the polarizer 12 in one of the polarizations of the optical fiber 14. The light flux spectra delivered to the sensors 20 are modulated periodically at frequencies that are a function of the values of the physical magnitudes acting on the sensors, and these fluxes are then transmitted to the receiver 28 where they are demultiplexed by activating the converters 38 sequentially. Phase modulation is performed at 44 by means of the electro-optical effect which gives rise to modulation of the birefringence. For example, sinusoidal modulation may be applied to the optical path length difference generated in the optical circuit 30, with detection at the modulation frequency and at its second harmonic making it possible to obtain the sine and the cosine of the phase of the output signal from the receiver 28, and thus making it possible to obtain the value of said phase.

It is also possible to multiply the signal obtained by said sinusoidal modulation by a squarewave function at the same frequency and to detect its second harmonic, whose phase is then the phase to be measured.

It is also possible to apply ramp variation to the birefringence, thereby generating an intermediate frequency whose phase is the phase to be measured.

The frequency at which the electrical voltages applied to the converters 38 are switched is high enough to avoid limiting the interrogation frequency of the sensors in the network. If the measurement passband of each sensor is b, then said band must be sampled at a frequency $2b$, and the passband for n sensors is then $2nb$. Switching frequencies of the order of a gigahertz thus make it possible to interrogate the sensors at high frequencies, even if the number of sensors is relatively large.

In the example of FIG. 1, it will be observed that the neutral axes of the link fiber 36 are oriented at 45° to the neutral axes of the receiver crystal. If necessary, a polarizer in alignment with the neutral axes of the optical fiber can be disposed at the inlet to the receiver 28.

Furthermore, the analyzer 50 may be placed against the substrate 34 as shown in FIG. 1 or else it may be independent from the integrated optical circuit and then be disposed in a conventional type imaging optical system having two lenses with the analyzer disposed between them.

Figure 2:
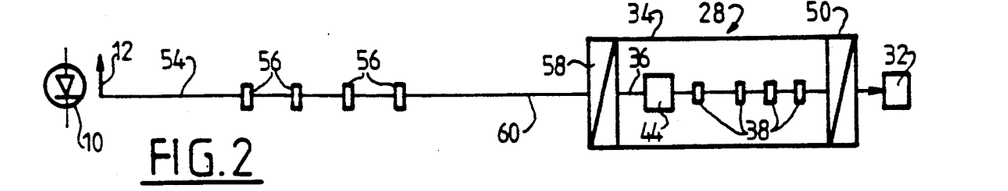
FIG. 2 shows a network of intrinsic sensors quasi-distributed on an optical fiber and associated with a receiver of the invention.

In the embodiment of FIG. 2, the network of sensors shown is of the type having intrinsic sensors quasi-distributed along an optical fiber and using both polarization modes of a fiber that maintains polarization. Networks of this type are described, in particular, in French patent application 90 01345 in the name of the Applicant. In general, they comprise an optical fiber 54 propagating a few modes and in which inter-mode coupling points 56 are formed, e.g. points of the index grating type. One end of the optical fiber 54 is illuminated by the source 10 of low coherence light via a polarizer 12 enabling the light to be injected in one polarization mode into the fiber 54 (when there are two polarization modes). The points 56 serve to couple the injected mode to the other mode. Since the two modes do not have the same propagation constants, interferometer signals are generated in the optical fiber 54. The modes can be mixed at the end of the network of sensors by means of a polarizer whose axes are at 45° to the axes of the fiber.

If the fiber uses two transverse modes instead of two polarization modes, the inlet polarizer may be replaced by a sharp bend, and the outlet analyzer may be replaced by a space filter or by a misalignment and a bend.

In the example shown in FIG. 2, the network of sensors formed by the intermode coupling points 56 in the optical fiber 54 uses two polarization modes, and the optical fiber extends all the way to the receiver 28 of the invention which includes an inlet polarizer 58 oriented at 45° to the neutral axes of the fiber 54 and at 45° to the neutral axes of the birefringent crystal of the receiver 28. Apart from the polarizer 58, the receiver has the same structure as the receiver 28 of FIG. 1, and thus includes an optical waveguide 36 formed on a substrate 34 of birefringent material, a phase modulator 44, and TE-TM converters 38 disposed along the light waveguide 36 in series with the birefringence modulator 44. An analyzer 50 oriented at 45° to the neutral axes of the birefringent crystal transmits the light to a photodetector 32. To simplify the drawing, the electrodes 40 and 48, the switching circuit 42, the modulation control circuit 46, and the phase modulator 52 are not shown in FIG. 2.

In this system, each of the optical path length differences generated in the fiber 54 between the coupling points 56 and the polarizer 58 corresponds to an optical path length difference suitable for being generated in the receiver 28 by activating one of the converters 38.

In a variant, the polarizer 58 may be detached from the receiver 28 and connected thereto by an optical fiber that maintains polarization, and having neutral axes that coincide with those of the polarizer 58.

In another variant, the end of the network of sensors may be realized by rotating the neutral axes of the portion 60 of the optical fiber connected to the receiver 28 through an angle of 45°. Under such circumstances, the polarizer 58 at the inlet to the receiver 28 is aligned with the neutral axes of the portion 60 of the fiber and is oriented at 45° to the neutral axes of the receiver crystal. In yet another variant, the network of sensors in FIG. 2 can be associated with the receiver 28 of FIG. 1 that does not include an inlet polarizer 58, providing the slow and fast axes of the optical fiber 54 correspond respectively to the fast and slow axes of the crystal in the receiver 28. The assembly of fiber plus receiver then constitutes a single interferometer.

When the network of sensors has two transverse modes in a single direction of polarization in a fiber that maintains polarization, the neutral axes of the fiber should coincide with the axes of the polarizer 58.

Figure 3:
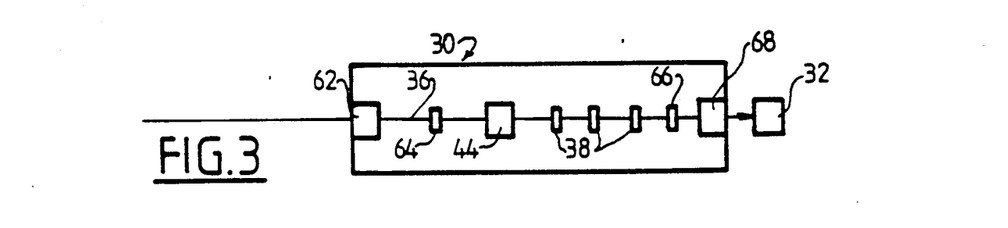
FIGS. 3 and 4 show variant embodiments of the receiver of the invention.

FIG. 3 shows a variant embodiment of the FIG. 2 receiver 28.

This variant is also usable with the network of sensors of FIG. 1 when the link fiber is a fiber that maintains polarization, in which case the polarization is aligned with a neutral axis. Under such circumstances, the inlet polarizer is aligned on the neutral axis, or else it may be unnecessary.

In FIG. 3, the inlet polarizer 58 and the outlet analyzer 50 of the integrated optical circuit 30 are each constituted by associating a polarizer in alignment with a neutral axis of the receiver crystal and a TE-TM mode coupler. The polarization axis selected by the inlet polarizer is the same as that of the polarizer 58 in FIG. 2. The integrated optical circuit 30 thus includes an inlet polarizer 62 aligned on one of the neutral axes of the crystal and followed by a TE-TM mode coupler 64 which is connected thereto by the light waveguide 36. Thereafter, as in FIGS. 1 and 2, there can be seen the birefringence modulator 44, the TE-TM mode converters 38 enabling the required path length differences to be generated, and then another TE-TM mode coupler 66 associated with a polarizer oriented on a neutral axis of the crystal to form the outlet analyzer 50. As before, a photodetector 32 picks up the light leaving the receiver of the invention.

With integrated optics, it is easier to make polarizers that coincide with a neutral axis of a birefringent crystal. This can be done merely by depositing metal or by using a waveguide structure for a single mode of polarization, which can be implemented, for example, by proton exchange, optionally followed by annealing. The TE-TM coupler 64 placed behind the inlet polarizer 62 serves to inject light into both of the neutral axes of the crystal. This coupler may be made using index gratings, or else it may be based on the controlled electro-optical effect, as described above for the converters. Under such circumstances, optimum coupling is 50% into the other polarization mode. For a network of quasi-distributed sensors having two modes of polarization, the polarizer 62 is at 45° to the neutral axes of the fiber or is aligned with one of the neutral axes if the neutral axes of the fiber are rotated through 45° at the end of the network.

The TE-TM coupler 66 followed by the outlet polarizer 68 acts as an analyzer which is angularly offset relative to the neutral axes of the crystal. Coupling of 50% corresponds to an angular offset of 45°.

Figure 4:
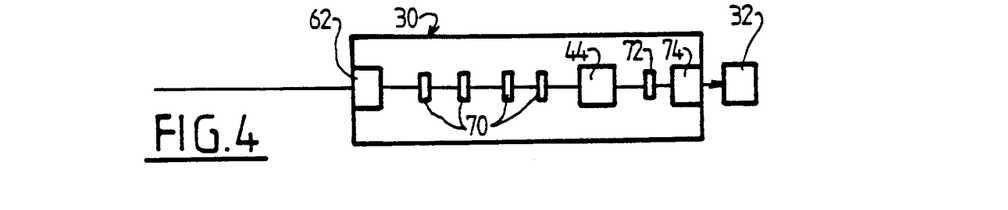

FIG. 4 shows another variant embodiment of the receiver 28 of the invention. As before, this receiver comprises an integrated optical circuit 30 in which the required path length differences are generated by TE-TM coupling activated by the electro-optical effect.

Under such circumstances, the integrated optical circuit 30 includes an inlet polarizer 62 oriented on a neutral axis of the crystal followed by a plurality of TE-TM mode couplers 70, and then by a birefringent modulator 44 followed by a TE-TM coupler 72 associated with an outlet polarizer 74 aligned with a neutral axis of the crystal. The photodetector 32 picks up the light leaving said polarizer 74.

The couplers 70 are of the controlled electro-optical effect type. When they are activated in succession, each of them in turn provides coupling of the mode selected by the polarizer into the other polarization mode. This makes it possible to excite both polarization modes and creates a phase shift corresponding to the optical path length difference between the two modes from the activated coupler. The association between the outlet coupler 72 and the polarizer 74 then generates a polarimeter interference signal. Activation of a coupler 70 corresponds to creating a path length difference very close to that of a sensor, and the spacing between the couplers makes it possible to match each path length difference to that of a sensor, such that all of the sensors of the network can be interrogated sequentially. For a signal optimum, it is preferable for the TE-TM couplers used to be 50:50 couplers. This can be achieved as described above for the converters. Nevertheless, a smaller amount of coupling is acceptable and depends on the required signal level. It may be observed that the outlet coupler 72 may be constantly active.

All sensor networks (ladder networks, star networks, etc., or networks quasi-distributed along a fiber) that are suitable for associating with the receiver of FIG. 3 can be associated with the receiver of FIG. 4.

In addition, the inlet polarizer 62 and the outlet analyzer may be placed against the substrate (as shown for the receiver in FIG. 2), with the polarizer 62 being aligned with the neutral axes of the receiver and with the analyzer (which replaces the coupler 72 and the polarizer 74) being at 45° to said neutral axes. The polarizer 62 and the outlet analyzer may also be implemented using optical imaging or else they may be fiber components.

The receiver of FIG. 4 which has been described as being suitable for use with a network of sensors having two modes of polarization may also be used with a network of sensors having two transverse modes. In which case, the selected polarization must coincide with the polarization selected by the inlet polarizer.

Figure 5:
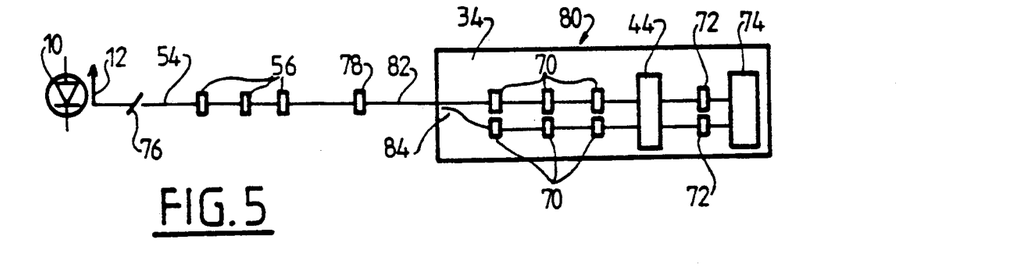
FIG. 5 is a diagram showing a network of intrinsic sensors quasi-distributed on an optical fiber, of the type having two guided transverse modes in two polarizations and associated with a receiver of the invention.

FIG. 5 shows a variant embodiment of a receiver of the invention applicable to a network of sensors having two transverse modes guided in both polarizations of a fiber that maintains polarization. The phase offset between the two modes caused by the physical magnitude to be measured (such as temperature or deformation) is then not the same in both polarizations, and this may help in discriminating between the modes by solving a system of two equations in two unknowns.

The network of sensors in FIG. 5 comprises an optical fiber 54 in which intermode coupling points 56 are formed and which is illuminated by a source of light 10 having short coherence length, e.g. via a polarizer 12. By rotating the neutral axes of the fiber 54 through 45° at a point 76 downstream from the polarizer 12, it is possible to inject both transverse modes into both polarizations. It would also be possible to orient the polarizer at 45° to the neutral axes of the fiber on injection thereof. The end of the network of sensors is realized by a space filter 78 connected to the receiver 80 of the invention by an optical fiber 82 that maintains polarization and that has its neutral axes coinciding with those of the fiber 54 to which it is connected. The space filter may be replaced by transverse misalignment and by a bend in the fiber 82 for eliminating higher order modes.

The receiver 80 is constituted by an integrated optical circuit formed on a substrate 34 of the same type as before, and including a TE-TM mode separator 84 at its inlet. The separator may be constituted by a directional coupler with the TE mode being in the through state and with the TM mode being in the crossed state, for example. Electro-optically controlled type TE-TM mode couplers 70 are then provided on two optical waveguide channels leaving the separator 84 and separated from each other by distances that generate path length differences corresponding to those created by the distances between the intermode coupling points 56 in the fiber 54. The receiver 80 then includes a birefringence modulator 44 acting on each of the light waveguide channels, and then at its outlet it includes TE-TM mode couplers 72 associated with a polarizer 74 oriented on a neutral axis of the receiver crystal (or else a discrete analyzer at 45° to the neutral axes). The output signals from the receiver 80 are received by two photodetectors.

The invention may also be applied to the case where there are two transverse modes in the receiver instead of two polarization modes using the birefringence of the receiver crystal. This can be done merely by using light fluxes having wavelengths that are shorter than the cutoff wavelength of the light waveguide of the receiver. The converters or mode couplers that are then used in the receiver correspond to the two transverse modes. The phase modulator uses the electro-optical effect enabling each mode to be modulated differently, and thus making it possible to modulate their phase difference. The polarizers are replaced by space filters which may be made simply. The receiver is again formed on a substrate of birefringent material or of semiconductor material.

Figure 6:
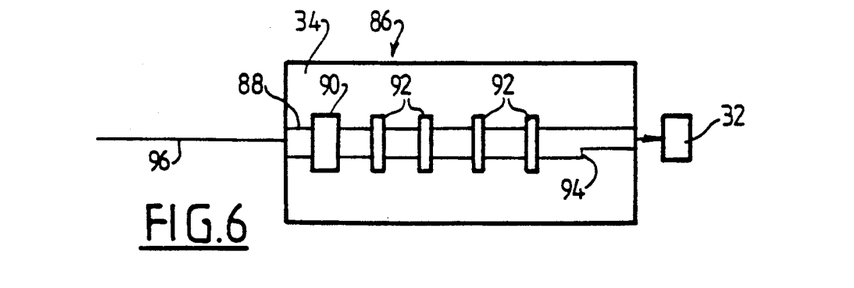
FIG. 6 is a diagram showing an embodiment of a receiver of the invention for a network of sensors having two transverse modes.

An embodiment of such a receiver is shown in FIG. 6. The receiver 86 is constituted by an integrated optical circuit including a substrate 34 of the same type as before on which a light waveguide 88 is formed connecting a phase modulator 90 and the mode converters 92 in series. A space filter 94 is provided at the outlet from the light waveguide and is realized by varying the shape of the waveguide (thickness, width, or both thickness and width) so as to mix both transverse modes. The receiver 86 is connected by an optical fiber 96 that maintains polarization and that has its neutral axes coinciding with those of the receiver crystal to a network of sensors which may be of the type shown in FIG. 1. Both transverse modes are excited in the light waveguide 88.

As before, a photodetector 32 receives the signal from the outlet from the receiver 86.

Figure 7:
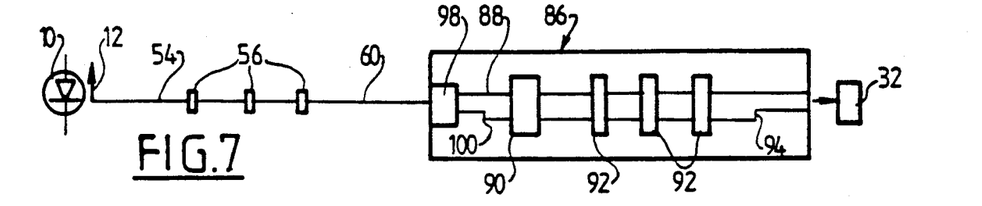
FIGS. 7 and 8 are diagrams showing networks of intrinsic sensors that are quasi-distributed along an optical fiber and associated with a receiver of the invention.

A receiver of this type may also be used with a network of intrinsic sensors quasi-distributed along an optical fiber as shown diagrammatically in FIG. 7.

In this figure, the network of sensors uses two polarization modes and comprises an optical fiber 54 in which intermode coupling points 56 have been formed and which is illuminated via a polarizer 12 by light having short coherence length. The last intermode coupling point 56 of the network of sensors is connected to the receiver 86 by an optical fiber 60 whose neutral axes are rotated through 45° and coincide with those of the receiver crystal. Under such circumstances, the receiver 86 includes an inlet polarizer 98 oriented on a neutral axis of the receiver crystal and which is formed merely by a layer of metal or by leakage propagation for the mode to be rejected. The polarizer 98 is formed on a monomode structure and is connected to the other components of the receiver 86 by a light waveguide 88 having a break in shape at 100 enabling light in one of the two transverse modes of the structure situated downstream therefrom to be injected. A second shape break in the light waveguide constitutes the space filter 94 situated at the outlet and enabling the two modes to be mixed together.

Figure 8:
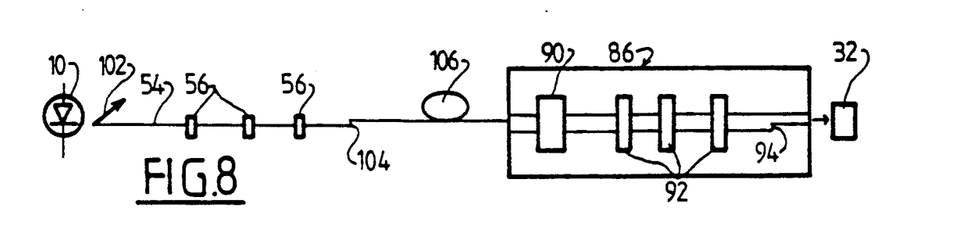

The network of sensors may also be of the type having two transverse modes as shown in FIG. 8. It then comprises an optical fiber 54 formed with intermode coupling points 56 and in which light emitted by the source 10 is injected at 102 in one of the transverse modes. A misalignment 104 of the optical fiber realizes the end of the network of sensors. A bend in the fiber (represented by a loop 106) enables the high order mode to be eliminated. The receiver 86 is of the same type as that shown in FIG. 6 and includes a phase modulator 90, mode converters 92, and a space filter 94 at its outlet.

Figure 9:
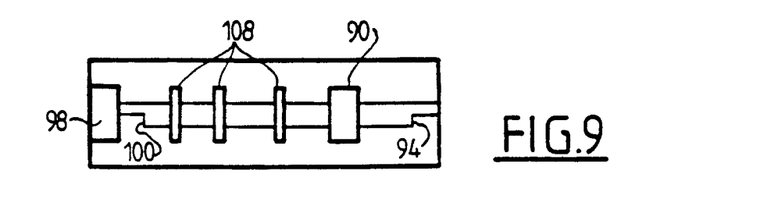
FIG. 9 is a diagram showing a variant embodiment of the FIG. 8 receiver.

The receiver associated with the network of sensors in FIG. 8 may also use transverse mode couplers as shown in FIG. 9. In which case it comprises an inlet polarizer 98 formed on a monomode structure and connected to a light waveguide by a shape break 100. Transverse mode couplers 108 formed on the light waveguide are followed by a phase modulator 90 and by a space filter 94. At the outlet from the polarizer 98, the single mode is injected into one of the modes of the light waveguide, and then each coupler 108, when activated, enables a path length difference to be generated corresponding to that of one of the sensors in the network.

As mentioned before, the substrates of the integrated optical circuits of the invention may be made of birefringent material, e.g. $LiNbO_3$ or $LiTaO_3$. It is also possible to use a semiconductor substrate (e.g. of GaAs if the wavelength is 0.8 μm), thereby making it possible to integrate on said substrate the functions of modulation, detection and demodulation, as shown diagrammatically in FIG. 10.

Figure 10:
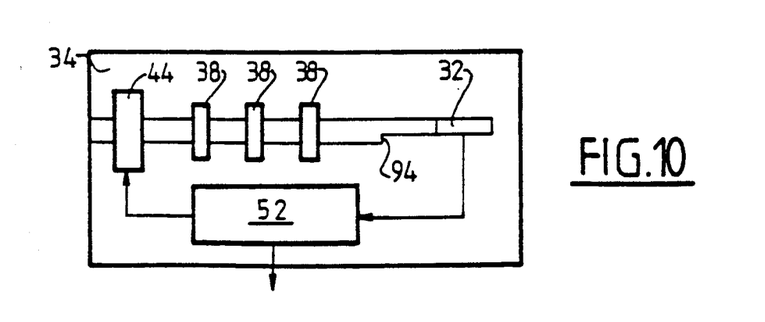
FIG. 10 is a diagram showing the integrated optical circuit of a receiver of the invention, formed on a semiconductor substrate.

In this figure, reference 34 designates a semiconductor substrate which includes a phase modulator 44 (or 90) at its inlet, mode converters 38 (or 92), an outlet analyzer (or a space filter 94), and a photodetector 32 connected to a demodulation circuit 52, itself connected to the phase modulator.

We claim:

1. A sequential demultiplexing receiver for a network of interferometer optical sensors using spectrum modulation encoding, wherein each sensor is subjected to a physical magnitude to be measured and generates an optical path length difference that is a function of the value of said magnitude, said receiver comprising:

an integrated optical circuit having two modes selected from the group consisting of polarization modes or transverse modes;

said circuit comprising a substrate that is birefringent or semiconductive;

a plurality of integrated components formed on said substrate for mode coupling or mode conversion by the electro-optical effect;

a light waveguide connecting said components in series; and means connected to each of said components for applying electrical voltages individually thereto to enable them to be activated sequentially, thus generating path length differences tuned to those of the sensors.

2. A receiver according to claim 1 wherein said means for applying electrical voltages comprises high frequency switching means for switching the electrical voltages applied to said mode conversion or mode coupling components.

3. A receiver according to claim 1 wherein said integrated optical circuit has two polarization modes and is of the monomode type on each of the neutral axes of said substrate.

4. A receiver according to claim 1 wherein said integrated optical circuit includes an electro-optical effect phase modulator.

5. A receiver according to claim 1 connected by a polarization-maintaining optical fiber to a network of sensors.

6. A receiver according to claim 1 wherein said integrated optical circuit has two polarization modes and includes an inlet polarizer and an outlet analyzer which are oriented at 45° to the neutral axes of said substrate.

7. A receiver according to claim 6 wherein said inlet polarizer comprises a polarizer oriented on the neutral axis of said substrate, followed by a TE-TM mode coupler.

8. A receiver according to claim 6 wherein said outlet polarizer comprises a TE-TM mode coupler, followed by a polarizer oriented on a neutral axis of said substrate.

9. A receiver according to claim 1 wherein said integrated optical circuit has two polarization modes and comprises a light waveguide channel on which are formed in series TE-TM mode converters preceded by an electro-optical effect birefringence modulator.

10. A receiver according to claim 1 wherein said integrated optical circuit has two polarization modes and comprises a light waveguide channel on which are formed in series TE-TM mode converters followed by an electro-optical effect birefringence modulator.

11. A receiver according to claim 1 connected to a network of quasi-distributed sensors having two transverse modes guided in one polarization or having two modes of polarization.

12. A receiver according to claim 1 wherein it receives a signal coming from two polarizations, and wherein said integrated optical circuit comprises a TE-TM mode separator at its inlet and two parallel light waveguide channels having formed thereon TE-TM mode couplers generating the required path length differences, followed by a birefringence modulator.

13. A receiver according to claim 1 wherein said integrated optical circuit has two polarization modes is of the multimode type and comprises a light waveguide channel on which are formed an electro-optical effect phase modulator and corresponding mode couplers or mode converters, and an outlet space filter for mixing the two modes.

14. A receiver according to claim 13 wherein said integrated optical circuit includes, at its inlet, a monomode structure on which a polarizer is formed.

15. A receiver according to claim 1 wherein said substrate is made of $LiNbO_3$ or $LiTaO_3$.

16. A receiver according to claim 1 wherein said substrate is a semiconductor and includes a photodetector and a phase demodulator.

* * * * *

UNITED STATES PATENT AND TRADEMARK OFFICE
CERTIFICATE OF CORRECTION

PATENT NO. : 5,335,065
DATED : August 2, 1994
INVENTOR(S) : Michel Lequime et al.

It is certified that error appears in the above-indentified patent and that said Letters Patent is hereby corrected as shown below:

Column 5, line 12, "d" should be -- $\underline{d}$ --.

Column 5, line 14, "l" should be -- $\underline{l}$ --.

Column 6, line 12, "b" should be -- $\underline{b}$ --.

Column 6, line 13, "n" should be -- $\underline{n}$ --.

Signed and Sealed this

Fifteenth Day of November, 1994

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,335,065
DATED : August 2, 1994
INVENTOR(S) : Michel Lequime et al.

It is certified that error appears in the above-identified patent and that said Letters Patent is hereby corrected as shown below:

On title page, item [56], the following references are omitted but should be listed:

| | | |
|---|---|---|
| 4,799,797 | 1-24-89 | Huggins |
| 191,588 | 8-20-86 | EPO |

A.D. Kersey et al., "Distributed and Multiplexed Fibre-Optic Sensor Systems", *Journal of the Institution of Electronic and Radio Engineers*, Vol. 58, No. 5 (Supplement), July/August 1988, pp. S99-S111.

Signed and Sealed this

Seventh Day of November, 1995

Attest:

BRUCE LEHMAN

Attesting Officer

Commissioner of Patents and Trademarks